United States Patent
Subramanian

(10) Patent No.: US 11,135,945 B2
(45) Date of Patent: Oct. 5, 2021

(54) SEAT ADJUSTMENT MECHANISM FOR A VEHICLE SEAT, AND VEHICLE SEAT

(71) Applicant: ADIENT ENGINEERING AND IP GMBH, Burscheid (DE)

(72) Inventor: Karthikeyan Maharajapuram Subramanian, Leverkusen (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 0 days.

(21) Appl. No.: 16/629,667

(22) PCT Filed: Jul. 12, 2018

(86) PCT No.: PCT/EP2018/068887
§ 371 (c)(1),
(2) Date: Jan. 9, 2020

(87) PCT Pub. No.: WO2019/012026
PCT Pub. Date: Jan. 17, 2019

(65) Prior Publication Data
US 2020/0156505 A1    May 21, 2020

(30) Foreign Application Priority Data
Jul. 12, 2017  (DE) .............. 10 2017 211 968.3

(51) Int. Cl.
*B60N 2/06* (2006.01)
*B60N 2/02* (2006.01)
*B60N 2/16* (2006.01)

(52) U.S. Cl.
CPC ......... *B60N 2/0232* (2013.01); *B60N 2/1615* (2013.01)

(58) Field of Classification Search
CPC ...... B60N 2/0232; B60N 2/062; B60N 2/067; B60N 2/1615; B60N 2/164; B60N 2/04; B60N 2/06; B60N 2/68
See application file for complete search history.

(56) References Cited

U.S. PATENT DOCUMENTS

| 3,071,407 | A |   | 1/1963 | Sloan |
| 4,721,337 | A | * | 1/1988 | Tomita .................. B60N 2/067 |
|           |   |   |        | 248/393 |

(Continued)

FOREIGN PATENT DOCUMENTS

| CA | 1163547 A | 3/1984 |
| CN | 1986277 A | 6/2007 |

(Continued)

OTHER PUBLICATIONS

European Patent Office, International Search Report with Written Opinion, dated Oct. 30, 2018, issued in PCT/EP2018/068887, 12 pages, European Patent Office, Rijswijk, Netherlands.

(Continued)

*Primary Examiner* — Shin H Kim
(74) *Attorney, Agent, or Firm* — Marshall & Melhorn, LLC

(57) ABSTRACT

A seat adjustment mechanism for a vehicle seat is provided. The mechanism may have a number of first pairs of rails, where each first pair of rails has an upper rail and a lower rail. The mechanism may also have a number of second pairs of rails with a substantially same acting direction as the number of first pairs of the pairs.

9 Claims, 4 Drawing Sheets

(56) References Cited

U.S. PATENT DOCUMENTS

| | | | | |
|---|---|---|---|---|
| 4,944,555 A | * | 7/1990 | Brusasco | B60N 2/0232 |
| | | | | 297/330 |
| 9,975,454 B2 | * | 5/2018 | Cailleteau | B60N 2/0232 |
| 2015/0130240 A1 | * | 5/2015 | Hozumi | B60N 2/0244 |
| | | | | 297/340 |
| 2019/0143849 A1 | * | 5/2019 | Murakami | B60N 2/062 |
| | | | | 297/344.24 |

FOREIGN PATENT DOCUMENTS

| | | |
|---|---|---|
| CN | 105228903 A | 1/2016 |
| EP | 0052545 A1 | 5/1982 |
| WO | 2014/115106 A1 | 7/2014 |

OTHER PUBLICATIONS

The State Intellectual Property Office of People's Republic of China. Office Action in Application No. 20180046572.X, dated Jul. 30, 2021, 7 pages.

* cited by examiner

SEAT ADJUSTMENT MECHANISM FOR A VEHICLE SEAT, AND VEHICLE SEAT

The invention relates to a seat adjustment mechanism for a vehicle seat, and to a vehicle seat.

Seat adjustment mechanisms for vehicle seats, and vehicle seats are known as prior art. By way of a known seat adjustment mechanism for a vehicle seat, the position of the latter can be adjusted in the longitudinal direction, that is to say in the x-direction. To this end, the vehicle seat has a first number of rail pairs, as a rule two rail pairs. Each rail pair comprises an upper rail and a lower rail.

It is an object of the present invention to specify an improved seat adjustment mechanism of the type mentioned at the outset, and an improved vehicle seat.

In relation to the seat adjustment mechanism, the object is achieved by way of a seat adjustment mechanism for a vehicle seat having the features which are specified in the claims. In relation to the vehicle seat, the object is achieved by way of a vehicle seat having the features which are specified in the claims.

A seat adjustment mechanism for a vehicle seat comprises a number of first rail pairs, each first rail pair comprising an upper rail and a lower rail. According to the invention, in accordance with a first alternative of the invention, a number of second rail pairs are provided which have a direction of action which is substantially identical, in particular is identical and is directed in the longitudinal direction, to the number of first rail pairs. The number of first rail pairs are actuable at the same time as the number of second rail pairs.

There is a substantially identical direction of action if the direction of action of the number of first rail pairs differs from the direction of action of the number of second rail pairs by less than 10°.

The advantages which are achieved by way of the seat adjustment mechanism according to the invention consist, in particular, in that an adjustment of the position of the vehicle seat can take place particularly rapidly in the longitudinal direction, that is to say in the x-direction. As a result, it is possible to considerably shorten, in particular, the time for positioning a vehicle seat, in particular a driver's seat, from a comfort position which is assumed, for example, during a driving state of an autonomously driving vehicle, into a driving position in comparison with conventional seat adjustment mechanisms. If the driving situation requires it in the case of autonomously driving vehicles, the vehicle seat is movable particularly rapidly into the driving position as a result, as a result of which the driver can more rapidly again assume a seat position which is suitable for driving. As a result, safety can be increased, and a probability of an accident is reducible.

One refinement of the seat adjustment mechanism according to the invention provides that a connecting element is arranged between the number of first rail pairs and the number of second rail pairs. As a result, the seat adjustment mechanism is mechanically particularly stable.

The connecting element is preferably of single-piece or multiple-piece configuration, as a result of which a connection between the first rail pairs and the second rail pairs is configurable in a particularly stable manner and, in particular if of multiple pieces, at the same time in a particularly weight-saving manner.

The connecting element is preferably a motor bridge, that is to say a component for receiving a number of electric motors.

A further refinement of the seat adjustment mechanism according to the invention provides that the lower rails of the number of first rail pairs are fastened on the upper side to the connecting element, and upper rails of the number of second rail pairs are fastened on the lower side to the connecting element. As a result, the first rail pairs are couplable to the second rail pairs and are jointly actuable in a particularly simple way.

A further refinement of the seat adjustment mechanism according to the invention provides that a number of motors, in particular electric motors, is arranged on the connecting element, with the result that the rail pairs are preferably simultaneously actuable in a simple way.

Here, a first motor is preferably arranged for electrically driving the number of first rail pairs, and a second motor is preferably arranged for electrically driving the number of second rail pairs. Here, the first motor is particularly preferably arranged on the upper side on the connecting element, and the second motor is particularly preferably arranged on the lower side on the connecting element, as a result of which the seat adjustment mechanism is configurable in a particularly compact and simple manner.

A further refinement of the seat adjustment mechanism according to the invention provides that holders for receiving in each case one pivoting lever are arranged at ends of the upper rails of the number of first rail pairs, as a result of which both a height adjustment of a seat part and an additional longitudinal adjustment thereof are made possible in a simple way. It is particularly advantageous that a longitudinal adjustment is possible at the same time as, that is to say together with, the adjustment of the rail pairs, and therefore in a particularly rapid manner.

In accordance with a second alternative of the invention, a seat adjustment mechanism according to the invention for a vehicle seat comprises a first linear adjustment system instead of a number of first rail pairs and a second linear adjustment system instead of a number of second rail pairs. The first and the second linear adjustment system have a substantially identical direction of action which is directed in the longitudinal direction. The first and the second linear adjustment system are actuable at the same time. For example, one linear adjustment system comprises a spindle drive. Refinements of the second alternative of the invention are structurally identical and/or identical in terms of action with abovementioned refinements of the first alternative of the invention.

In accordance with a third alternative, a seat adjustment mechanism according to the invention for a vehicle seat comprises a number of rail pairs and a linear adjustment system. The number of rail pairs and the linear adjustment system have a substantially identical direction of action which is directed in the longitudinal direction. The number of rail pairs and the linear adjustment system are actuable at the same time. For example, the linear adjustment system comprises a spindle drive. Refinements of the third alternative of the invention are structurally identical and/or identical in terms of action with abovementioned refinements of the first alternative of the invention.

A vehicle seat according to the invention has a seat adjustment mechanism according to the invention. It is advantageous that an adjustment of the position of the vehicle seat can take place particularly rapidly in the longitudinal direction. As a result, it is possible, in particular, to considerably shorten the time for positioning the vehicle seat, in particular a driver's seat, from a comfort position which is assumed during a driving state of an autonomously driving vehicle into a driving position in comparison with conventional seat adjustment mechanisms. If the driving situation requires it in the case of autonomously driving vehicles, the vehicle seat is movable particularly rapidly into the driving position as a result, as a result of which the driver can rapidly again assume a seat position which is suitable for driving. As a result, safety can be increased, and a probability of an accident is reducible.

BRIEF DESCRIPTION OF THE DRAWINGS

Exemplary embodiments of the invention will be described in greater detail on the basis of drawings, in which.

Parts which correspond to one another are provided with the same designations in all figures.

DETAILED DESCRIPTION

Figure 1:
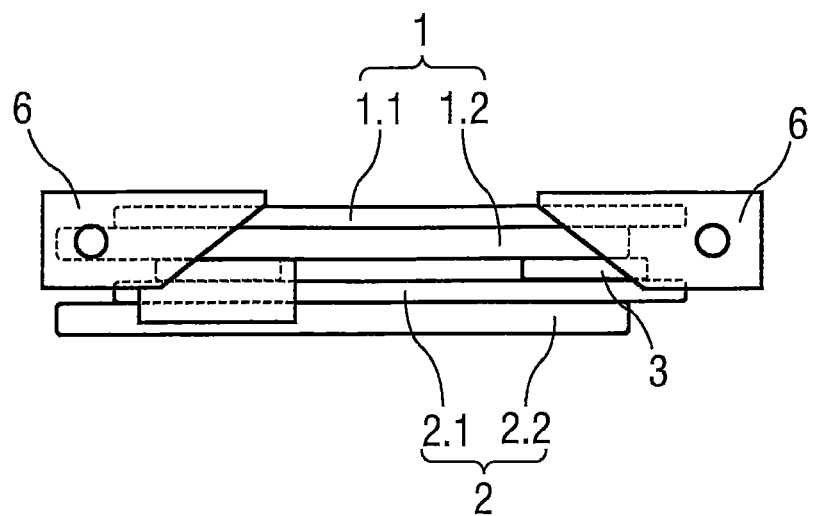
FIG. 1 diagrammatically shows a side view of a seat adjustment mechanism according to the invention, FIG. 2 diagrammatically shows an associated plan view, FIG. 3 diagrammatically shows an associated view from the front, FIG. 4 diagrammatically shows a further associated side view with a seat part.

FIG. 1 diagrammatically shows a seat adjustment mechanism for the electric adjustment of a vehicle seat in the longitudinal direction, that is to say in the x-direction. Two first rail pairs 1 which are arranged at the top comprise in each case one upper rail 1.1 and one lower rail 1.2. Two second rail pairs 2 which are arranged at the bottom comprise in each case one upper rail 2.1 and one lower rail 2.2. The lower rails 2.2 of the second rail pair 2 are fastened on the lower side to a vehicle floor. The upper rails 2.1 of the second rail pairs 2 which are arranged at the bottom are connected on the upper side to a two-piece connecting element 3, for example are screwed or welded. The lower rails 1.2 of the first rail pairs 1 which are arranged at the top are connected on the lower side to the upper side of the connecting element 3, for example are screwed or welded. Holders 6 are arranged at the ends of the upper rails 1.1 of the first rail pairs 1 which are arranged at the top, by way of which holders 6 in each case one pivotable connection can be established.

In the case of actuation of the second rail pairs 2 which are arranged at the bottom, a longitudinal adjustment with respect to the vehicle floor takes place both of the connecting element 3 and of the first rail pairs 1 which are fastened thereto and are arranged at the top with the holders 6.

In the case of actuation of the first rail pairs 1 which are arranged at the top, a longitudinal adjustment with respect to the connecting element 3 takes place both of the upper rails 1.1 and of the holders 6 which are fastened thereto.

If the two rail pairs 1, 2 are actuated at the same time and in the same direction of action, a longitudinal adjustment takes place at a speed which corresponds to the sum of the differential speeds between the rails 1.1, 1.2 firstly and the rails 2.1, 2.2 secondly. Here, the longitudinal adjustment of the vehicle seat is particularly rapidly possible in order to set the comfort position from the driving position and vice versa.

This is particularly advantageous because a longitudinal adjustment of the vehicle seat is made possible particularly rapidly from the comfort position into the driving position if, for example, a termination of autonomous driving due to the driving situation and assuming of the vehicle control by way of a driver are required.

Figure 2:
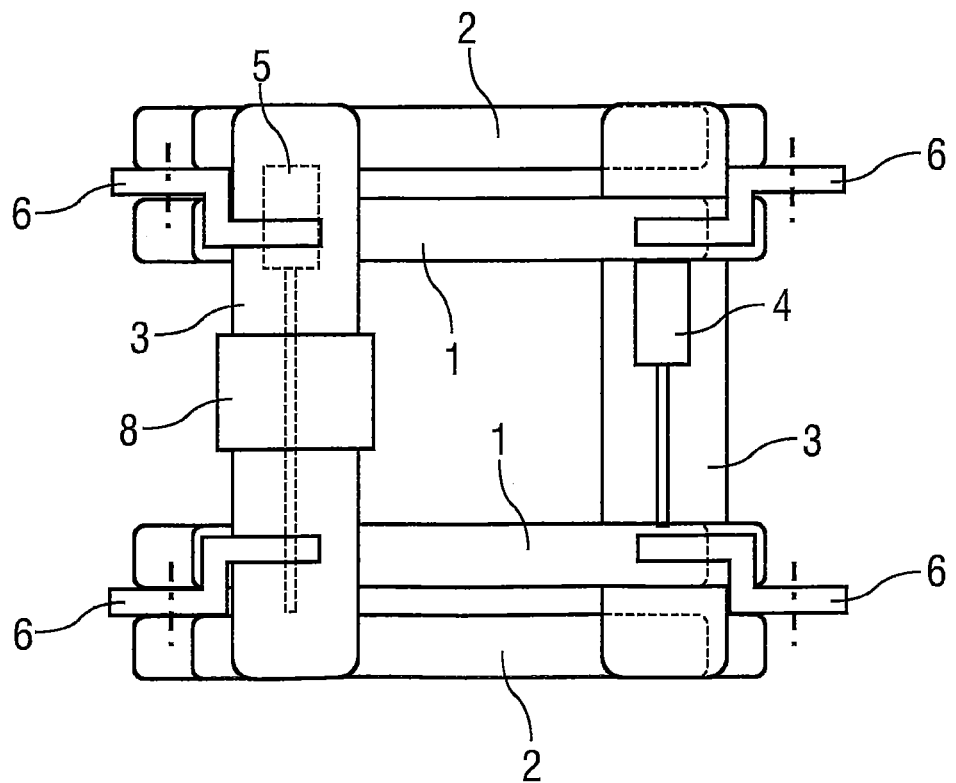

FIG. 2 diagrammatically shows an associated plan view. An upper motor 4 is fastened on the upper side of the part (shown on the right) of the connecting element 3 which is the rear part (in the driving direction) of the connecting element 3, which upper motor 4 serves to drive the upper, that is to say first rail pairs 1, more precisely to drive the upper rails 1.1 with respect to the corresponding lower rails 1.2.

A lower motor 5 is fastened to the underside of the part (shown on the left) of the connecting element 3 which is the front part (in the driving direction) of the connecting element 3, which lower motor 5 serves to drive the lower, that is to say second rail pairs 2, more precisely to drive the upper rails 2.1 with respect to the corresponding lower rails 2.2.

An optional retractor is shown on that part of the connecting element 3 which is shown on the left.

Here, the longitudinal adjustment of the vehicle seat is particularly rapidly possible in order to set a comfort position from the driving position and vice versa, namely by way of simultaneous actuation of the rail pairs 1, 2 in an identical direction of action.

Figure 3:
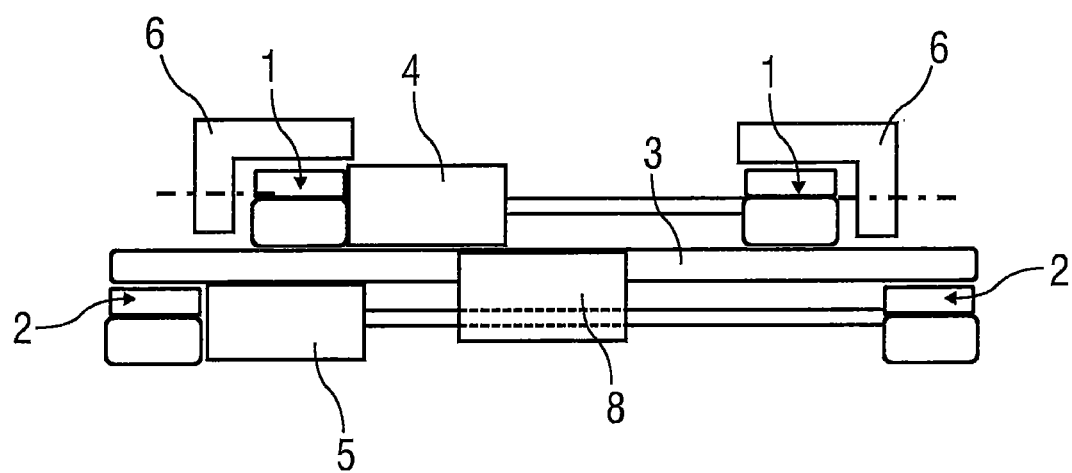

FIG. 3 diagrammatically shows the seat adjustment mechanism which is shown in the abovementioned figures, in a view from the front.

Figure 4:
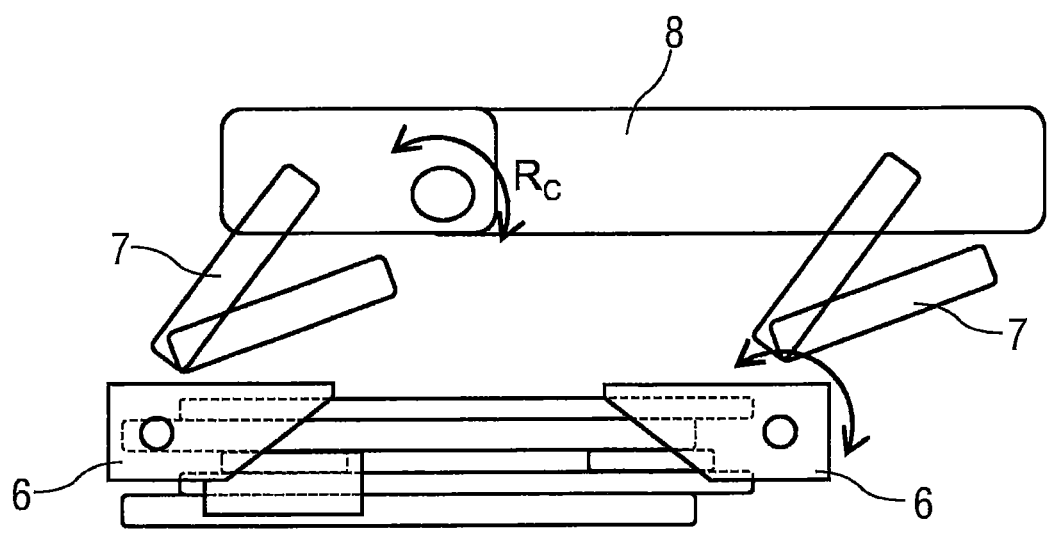

FIG. 4 diagrammatically shows the invention which is shown in FIG. 1 with an adjustable-height seat part 8 which is fastened pivotably to the holders 6 by means of four pivoting levers 7. Here, a front and rear part of the seat part 8 and a backrest (not shown here) which is fastened to the seat part 8 are optionally additionally, preferably automatically and/or electrically, pivotable by way of mutual rotation of the front and the rear part of the seat part 8 by means of a horizontal pivot axis $R_c$, for example in order to move the vehicle seat from a driving position into a comfort position and vice versa, or in order to set it comfortably in a driving position or in a comfort position. The front part of the seat part 8 is preferably fastened pivotably on the front side, and the rear part of the seat part 8 is preferably fastened pivotably on the rear side, with the result that the horizontal pivot axis $R_c$ which is the connecting point between the front part and the rear part moves upward or downward in the case of the rotation of the front part with respect to the rear part.

Figure 5A:
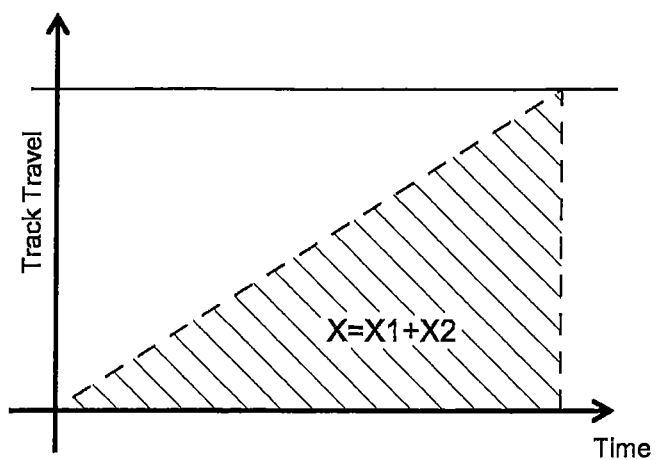
FIG. 5a, 5b show diagrams of time-dependent longitudinal adjustments.

FIG. 5a shows a diagram with a chronological sequence of a, for example, maximum longitudinal adjustment of the vehicle seat (not shown here), either solely by way of actuation of the first rail pairs 1 or solely by way of actuation of the second rail pairs 2. A defined time duration is required to reach a defined, for example maximum longitudinal adjustment.

Figure 5B:
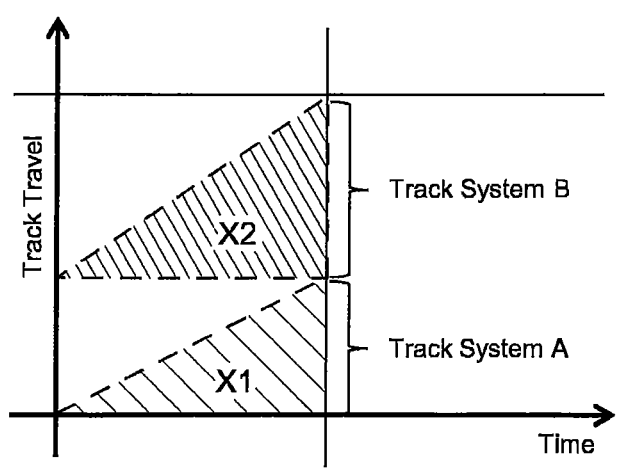

FIG. 5b shows a diagram with a chronological sequence of a, for example, maximum longitudinal adjustment of the vehicle seat (not shown here), in the case of a simultaneous actuation of the first rail pairs 1 and the second rail pairs 2 which takes place in the same direction of action. A time duration which is considerably smaller than that which is shown in FIG. 5a is required to reach a defined, for example maximum longitudinal adjustment.

LIST OF DESIGNATIONS

1 First rail pairs
1.1 Upper rail of a first rail pair
1.2 Lower rail of a first rail pair
2 Second rail pairs
2.1 Upper rail of a second rail pair
2.2 Lower rail of a second rail pair
3 Connecting element 4 First motor
5 Second motor
6 Holder
7 Pivoting lever
8 Seat part
$R_c$ Pivot axis

The invention claimed is:

1. A seat adjustment mechanism for a vehicle seat, comprising a number of first rail pairs, each first rail pair comprising an upper rail and a lower rail, wherein a number of second rail pairs have a substantially identical direction of action to the number of first rail pairs, and wherein the lower rails of the number of first upper rail pairs are fixed on the upper side to a connecting element and upper rails of the number of second lower rail pairs are fixed on the lower side to the connecting element and at least one motor is arranged on the connecting element, wherein upon movement of said upper rails of said lower rail pairs, said at least one motor and said connecting element are adapted to move with said upper rails of said lower rail pairs.

2. The seat adjustment mechanism as claimed in claim 1, wherein a connecting element is arranged between the number of first rail pairs and the number of second rail pairs.

3. The seat adjustment mechanism as claimed in claim 2, wherein the connecting element is single-piece or multiple-piece.

4. The seat adjustment mechanism as claimed in claim 2, wherein the connecting element is a motor bridge.

5. The seat adjustment mechanism as claimed in claim 2, wherein the lower rails of the number of first rail pairs are fastened on the upper side to the connecting element, and upper rails of the number of second rail pairs are fastened on the lower side to the connecting element.

6. The seat adjustment mechanism as claimed in claim 1, wherein a first motor is arranged for electrically driving the number of first rail pairs, and in that a second motor is arranged for electrically driving the number of second rail pairs.

7. The seat adjustment mechanism as claimed in claim 1, wherein the first motor is arranged on the upper side on the connecting element, and in that the second motor is arranged on the lower side on the connecting element.

8. The seat adjustment mechanism as claimed in claim 1, wherein holders for receiving in each case one pivoting lever are arranged at ends of the upper rails of the number of first rail pairs.

9. A seat adjustment mechanism for a vehicle seat, comprising:
   a number of first rail pairs, each first rail pair comprising an upper rail and a lower rail,
   wherein a number of second rail pairs have a substantially identical direction of action to the number of first rail pairs,
   wherein the lower rails of the number of first upper rail pairs are fixed on an upper side to a connecting element and upper rails of the number of second lower rail pairs are fixed on a lower side to the connecting element and at least one first motor is connected to a first side of a connecting element,
   said at least one first motor is adapted to move said upper rails of said first upper rail pairs, and at least one second motor is connected to a second, opposite side of said connecting element, said at least one second motor is adapted to move said upper rails of said second lower rail pairs, wherein said at least one second motor is connected to said connecting element in such a way that upon movement of said upper rails of said lower rail pairs, said at least one second motor and said connecting element are adapted to move with said upper rails of said lower rail pairs.

* * * * *